United States Patent
Murray et al.

[19]

[11] Patent Number: 5,911,661
[45] Date of Patent: *Jun. 15, 1999

[54] ZONE CABLING TERMINATION CABINET

[75] Inventors: Richard A. Murray; Victor E. Murray, both of Longwood, Fla.

[73] Assignee: American Access Technologies, Inc., Altamonte Springs, Fla.

[*] Notice: This patent is subject to a terminal disclaimer.

[21] Appl. No.: 08/719,419

[22] Filed: Sep. 24, 1996

[51] Int. Cl.$^6$ ...................................... E04C 2/52
[52] U.S. Cl. ................ 52/220.6; 52/506.06; 52/127.8; 312/242; 312/245; 312/321.5; 312/223.6; 174/48
[58] Field of Search ................... 52/220.1, 220.6, 52/220.8, 506.04, 506.09, 127.1, 127.7, 127.8; 312/242, 245, 321.5, 326, 223.1, 223.6; 174/48, 49, 52.1, 52.5, 53, 65 MS, 65 GL; 49/400, 401, 386

[56] References Cited

U.S. PATENT DOCUMENTS

| | | | |
|---|---|---|---|
| 3,131,512 | 5/1964 | MacLeod, Jr. | 50/127 |
| 3,359,695 | 12/1967 | Gazerro | 52/506.09 X |
| 4,060,294 | 11/1977 | Haworth et al. | 339/4 |
| 4,237,663 | 12/1980 | Storer | 52/204 |
| 4,372,629 | 2/1983 | Propst et al. | |
| 4,592,602 | 6/1986 | Kuster et al. | 312/223.6 |
| 4,679,867 | 7/1987 | Heldenbrand et al. | 312/223.6 X |
| 4,686,381 | 8/1987 | Boteler et al. | |
| 4,702,535 | 10/1987 | Beun | 312/223.1 X |
| 4,738,054 | 4/1988 | Muth et al. | 49/386 |
| 4,890,318 | 12/1989 | Crane et al. | 379/399 |
| 4,916,862 | 4/1990 | Storer | 49/386 |
| 4,922,668 | 5/1990 | Payne | 52/221 |
| 4,967,041 | 10/1990 | Bowman | 174/48 |
| 4,984,982 | 1/1991 | Brownlie et al. | 439/131 |
| 5,008,491 | 4/1991 | Bowman | 174/48 |
| 5,082,336 | 1/1992 | Munch et al. | 49/401 X |
| 5,231,562 | 7/1993 | Pierce et al. | 174/48 X |
| 5,329,865 | 7/1994 | McWard | 312/242 X |
| 5,407,261 | 4/1995 | Mercer | 312/245 X |
| 5,435,641 | 7/1995 | Dupuis et al. | 312/223.1 |
| 5,573,321 | 11/1996 | Bell, Jr. | 174/48 X |
| 5,574,251 | 11/1996 | Sevier | 312/223.6 X |
| 5,575,668 | 11/1996 | Timmerman | 174/48 X |
| 5,595,028 | 1/1997 | Handzlik | 312/245 |

FOREIGN PATENT DOCUMENTS 2690287  10/1993  France.

*Primary Examiner*—Christopher Kent
*Assistant Examiner*—Yvonne Horton-Richardson
*Attorney, Agent, or Firm*—Allen, Dyer, Doppelt, Milbrath & Gilchrist, P.A.

[57] ABSTRACT

A zone cabling termination cabinet of fire-resistant metal, provides a non-plenum enclosed space, close to the work station it serves, recessed into the plenum above a suspended ceiling, for housing communications cable connections and switching, without the need to use high-cost plenum fire-rated materials. The cabinet has an equipment mounting plate removably mounted on the interior surface of an access door, which when closed is flush with the bottom wall of the cabinet, which in turn is flush with the suspended false ceiling. The exposed lower surface of the door is clad with fire resistant ceiling tile material, the utility thereof being two-fold: the cladding makes the cabinet more fire resistant, and visually it blends with the rest of the ceiling, is inconspicuous and not readily detected by the unsuspecting eye, thus providing some measure of security from unauthorized meddling. The equipment mounting plate is easily removed from the door for making necessary cabling and switching changes at a remote workbench or table top. Cables enter and exit the cabinet through fire-rated penetrations in opposing side walls of the cabinet. The cabinet facilitates the decentralization of cable terminations and switching for location in secure user-defined zones of a building close to the work stations served thereby, thus eliminating the need for large, centralized and insecure IDFs.

18 Claims, 7 Drawing Sheets

ZONE CABLING TERMINATION CABINET

BACKGROUND OF THE INVENTION

This invention relates to terminal enclosures for housing telephone or other communication cable connections and the like.

Heretofore in the telecommunications industry, in order to provide telephone or networking service to a plurality of customers in a building, a centralized location has been designated, which is customarily called an intermediate distribution frame, or IDF. The IDF is typically a common room, closet or wall of a room, set aside for the routing of all of the communication cables for all of the work stations of different entities and users in all of the offices or tenant spaces in the building. The IDF must be located away from electrical power connections in order to avoid electromagnetic interference with communications transmission. Each work station with communications capability added or changed requires new lengths of cable to be led to and from the centralized IDF, often involving lengthy and circuitous routing, thus extensive amounts of cable. The space required for the IDF can be sizable, and it lessens the amount of floor space available for other uses by which leasing income from tenants could be earned. Another disadvantage of IDFs is that they are necessarily accessible by all tenants of the building, resulting in little or no security from meddling therewith.

The object of this invention is to decentralize cable termination and switching to smaller user-defined zones located in close proximity to the work stations served, thereby eliminating or diminishing the need for centralized IDFs, decrease the amount of wiring or other cable required for each work station, provide security, and free floor space by utilizing plenum space between a true ceiling and a suspended false ceiling of tiles. The objects of this invention are achieved by providing a recessed fire-resistant enclosure within the ceiling tile grid above each work station. This invention, the Zone Cabling Termination Cabinet, is intended to make it easier to maintain, change, add or replace communications connections, to move the point of wiring connections closer to the work station, thereby reducing the extent of disruption of work activities and the huge amount of wire running back and forth throughout a building, which heretofore has been required to install or make any changes to a communications system, and also improving reception of communications by shortening the cabling.

SUMMARY OF THE INVENTION

The Zone Cabling Termination Cabinet, preferably made of fire-rated metal, creates a non-plenum enclosed space, close to the work station it serves, recessed into the plenum above a suspended ceiling, for housing cable connections and switching, without the need to use high-cost plenum fire-rated materials. The cabinet has an equipment mounting plate removably mounted on a removable access panel, which when closed is flush with the bottom wall of the cabinet, which in turn is flush with the suspended false ceiling. The exposed lower surface of the panel is clad with ceiling tile material, the utility thereof being two-fold: the cladding gives the cabinet at least a NEMA 2 fire rating; and visually it blends with the rest of the ceiling, is inconspicuous and not readily detected by the unsuspecting eye, thus providing some measure of security from unauthorized meddling. The access panel is preferably a hinged door opening to a vertical position, and the equipment mounting plate on the interior surface of the door is easily removed therefrom for making necessary changes at a workbench or table top. Cables enter and exit the cabinet through fire-rated penetrations in opposing side walls of the cabinet. The cabinet facilitates the decentralization of cable terminations and switching for location in secure user-defined zones of a building close to the work stations served thereby, thus eliminating the need for large, centralized and insecure IDFs.

DETAILED DESCRIPTION OF THE DRAWINGS

Figure 1:
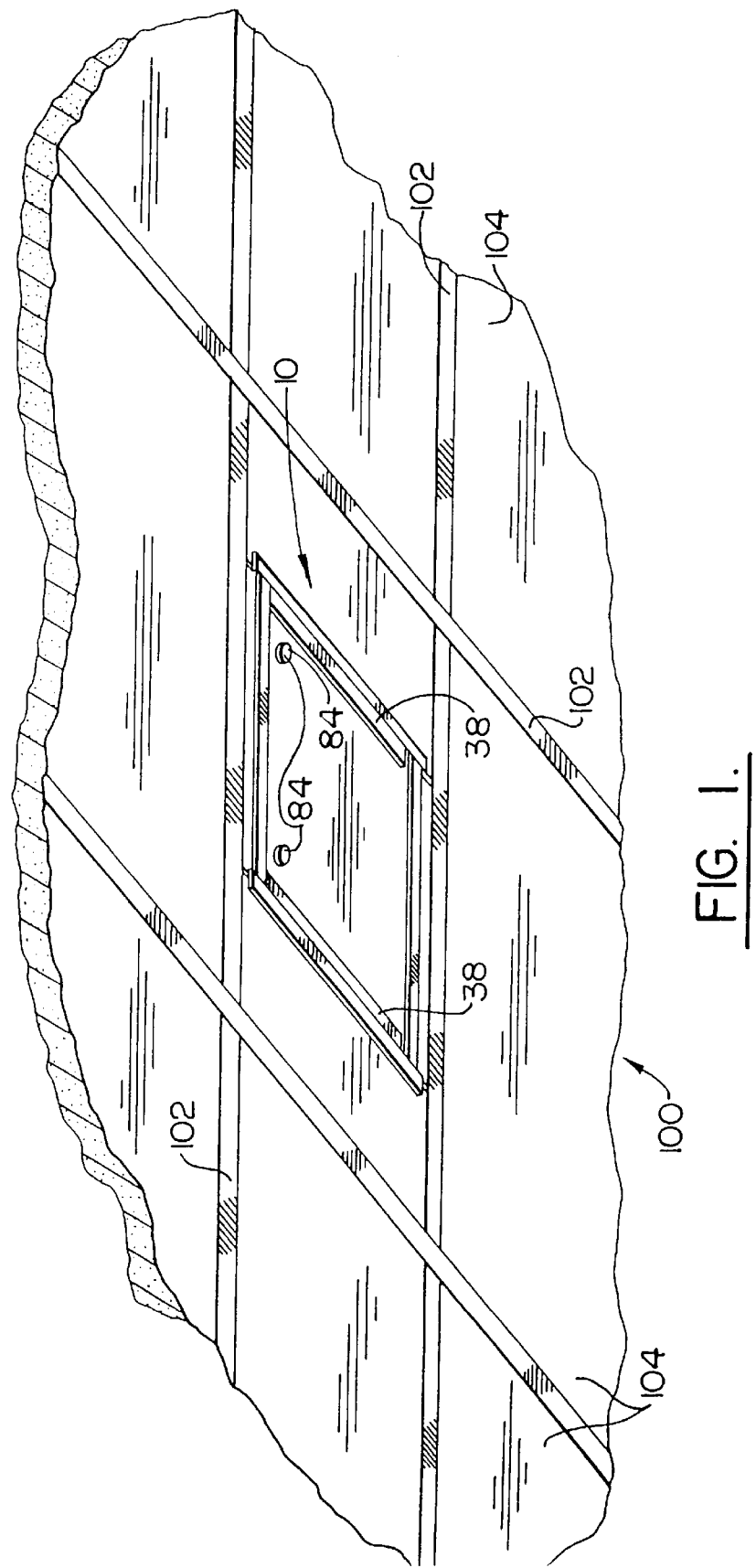
FIG. 1 is a perspective view from below of the invention installed within a suspended tile ceiling, its access panel closed.

Referring to the drawings, FIG. 1 shows the appearance from below of the Zone Cabling Termination Cabinet 10 after mounting within the support grid 102 for ceiling tiles 104 of a suspended false ceiling 100. Typically the ceiling tiles will be made of a fire-resistant gypsum material. In FIGS. 2, 3, 4, and 5 it can be seen that the preferred embodiment of the invention 10 is comprised of an enclosure having two pairs of opposing side walls 14a and 14b, and 14c and 14d; top wall 16, and bottom wall 18, which extends beyond the horizontal perimeter formed by the side walls 14a through 14d. All structural components of the enclosure are preferably aluminum or steel, to meet fire code requirements. The length and width of the perimeter of bottom wall 18 should preferably match those of the ceiling tiles 104. Access to the interior of the enclosure is provided through an aperture 20 through bottom wall 18, herein depicted as being rectangular and more or less centered on the surface of bottom wall 18. The edges of the aperture have attached thereto U-shaped flanges 22 to receive and retain ceiling tile material 24 as a cladding on the exterior lower surface of bottom wall 18, the material preferably being fire-resistant and presenting the same appearance as that of tiles 104. of the surrounding ceiling. Any conventional means of attachment of flanges 22 could be used, such as spot-welding. A removable access door 30 fits and closes aperture 20. The preferred embodiment shown in the drawings is a downward-opening door attached to bottom wall 18 at one long side thereof to a matching side of aperture 20 by a piano hinge 32, shown in FIGS. 4 and 5. The arcuate travel of door 30 pivoting on hinge 32 is controlled by a pair of conventional pivoting collapsible braces 34, attached at one end of each brace to bottom wall 18 at the short sides of aperture 20 adjacent the non-hinge long side thereof, and attached at their opposite ends to the corresponding short sides of said door adjacent its non-hinged long side. Braces 34 obviously assist in providing additional support for door 30 to that provided by hinge 32. An optional stop 35 may be affixed to a brace 34 to prevent the door 30 from swinging open past a vertical orientation. The attachments of braces 34 to door 30 are made with conventional slotted brackets 36 to provide for sliding movement as well as pivoting movement. Door 30, like the exterior surface of bottom wall 18 adjacent aperture 20, has a pair of U-shaped flanges 38 on its exterior surface adjacent the short sides thereof, the open ends of the U's facing each other, to removably receive cladding of ceiling tile material 40.

Various fastening means could be used to maintain the door in a closed position. Shown in FIGS. 3, 4, and 5 are a pair of bolts 42, with hand-turnable heads or knobs 44, the bolts inserted through apertures 46 in door 30 and through and flange 48, described below, bolts 42 mating with nut means, not shown, affixed in a flange 49 mounted on the interior surface of bottom wall 18, overlapping the long edge of aperture 20 opposite the piano-hinged edge.

Figure 8:
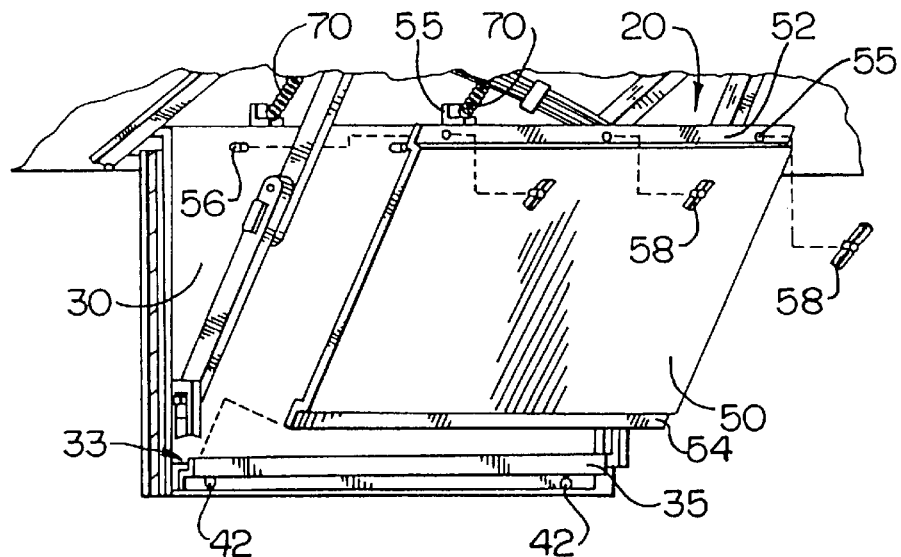
FIG. 8 is a detail exploded perspective view of the equipment mounting plate installed on the inside surface of the access door of the invention.

A prepunched equipment mounting plate 50, shown without anything mounted to it in FIG. 8, is removably attached to the inside of door 30 in parallel relationship thereto. Plate 50 has L-shaped top and bottom edge flanges 52 and 54, respectively, which serve to keep all but the flanges 52 and 54 spaced from door 30 to provide room for nuts, bolt heads, and the like that are used to fasten equipment to the plate, using prepunched holes therein for insertion of fastening means. Flanges 52 and 54 also serve in attaching the plate 50 to the door 30. Door 30 has a Z-shaped flange 31 affixed to its interior surface parallel and proximate to its long non-hinged edge, which forms a channel 33 with door 30. Flange 54 fits into channel 33 and is supported by flange 31. Flange 52 has a plurality of apertures 55 situated for mating engagement with immovable bolts 56 affixed to the inside of door 30, and wing nuts 58 are used to secure the bolts in position through apertures 55.

Figure 3:
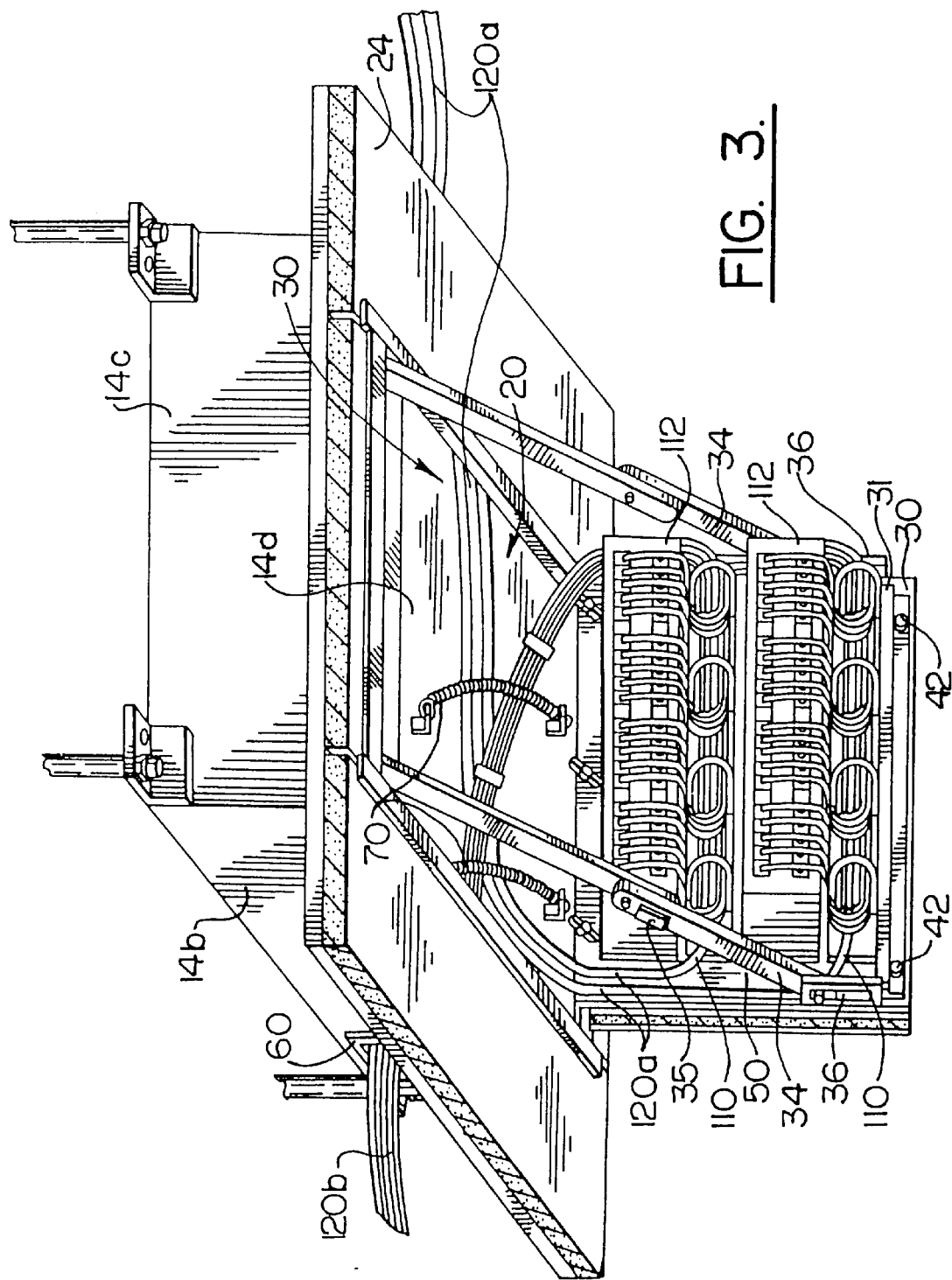
FIG. 3 is a perspective view of the interior of the invention with wiring installed on the equipment mounting plate.
Figure 4:
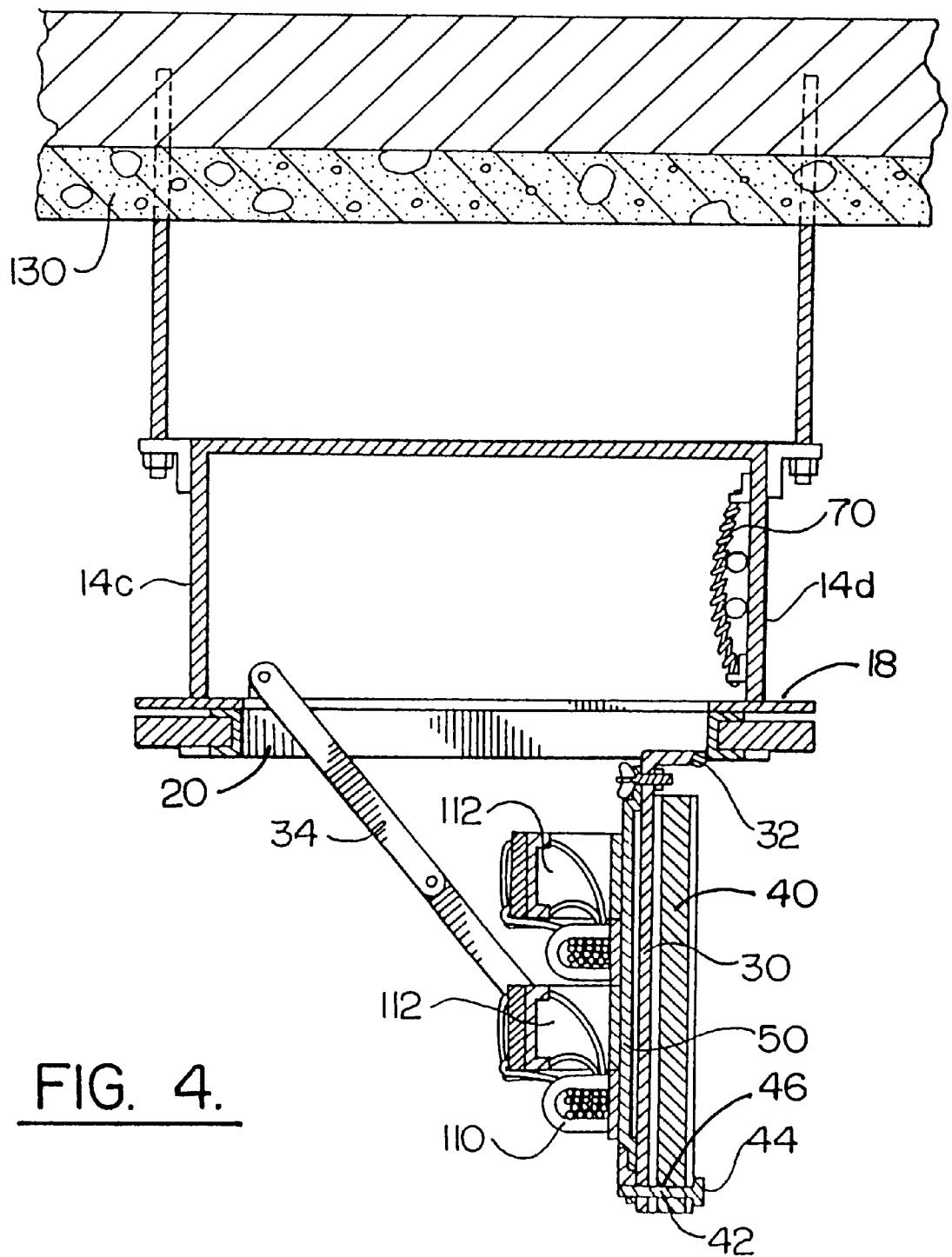
FIG. 4 is a vertical section taken along the line 5—5 of FIG. 2, except that the access panel is in its open position.
Figure 5:
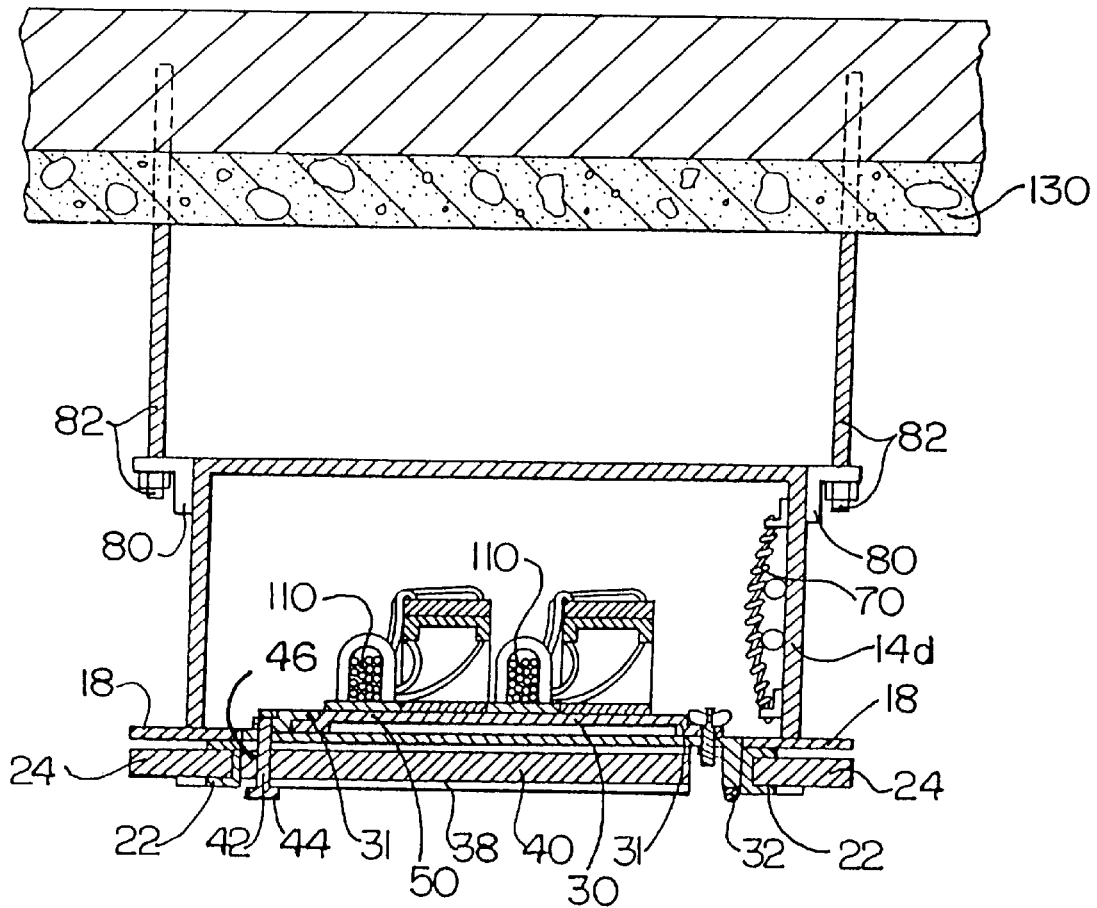
FIG. 5 is a vertical section taken along the line 5—5 of FIG. 2, with the access door closed.
Figure 6:
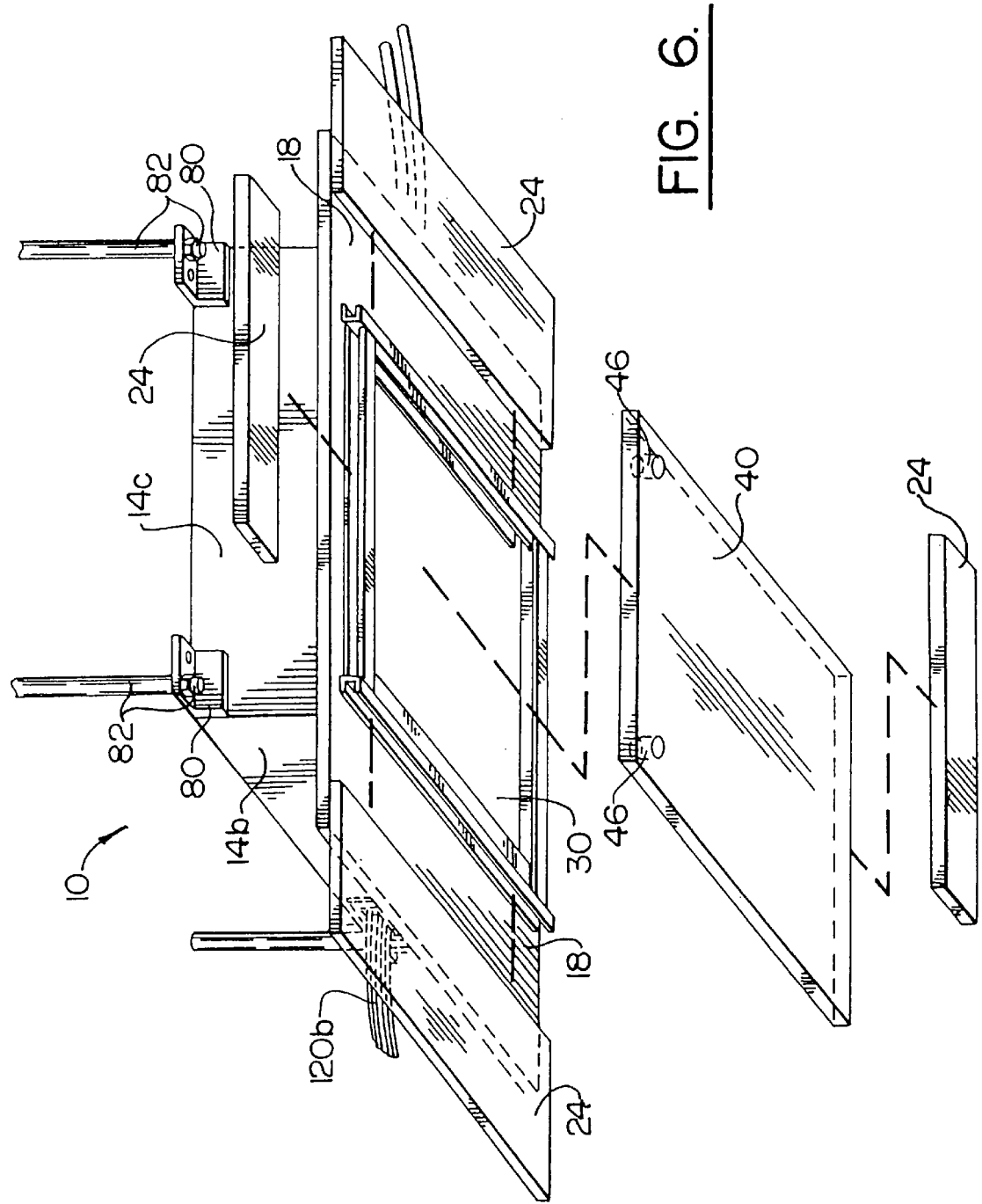
FIG. 6 is an exploded perspective view from below of the exterior of the invention depicting the insertion of ceiling tile pieces into flanges on the bottom wall.
Figure 7:
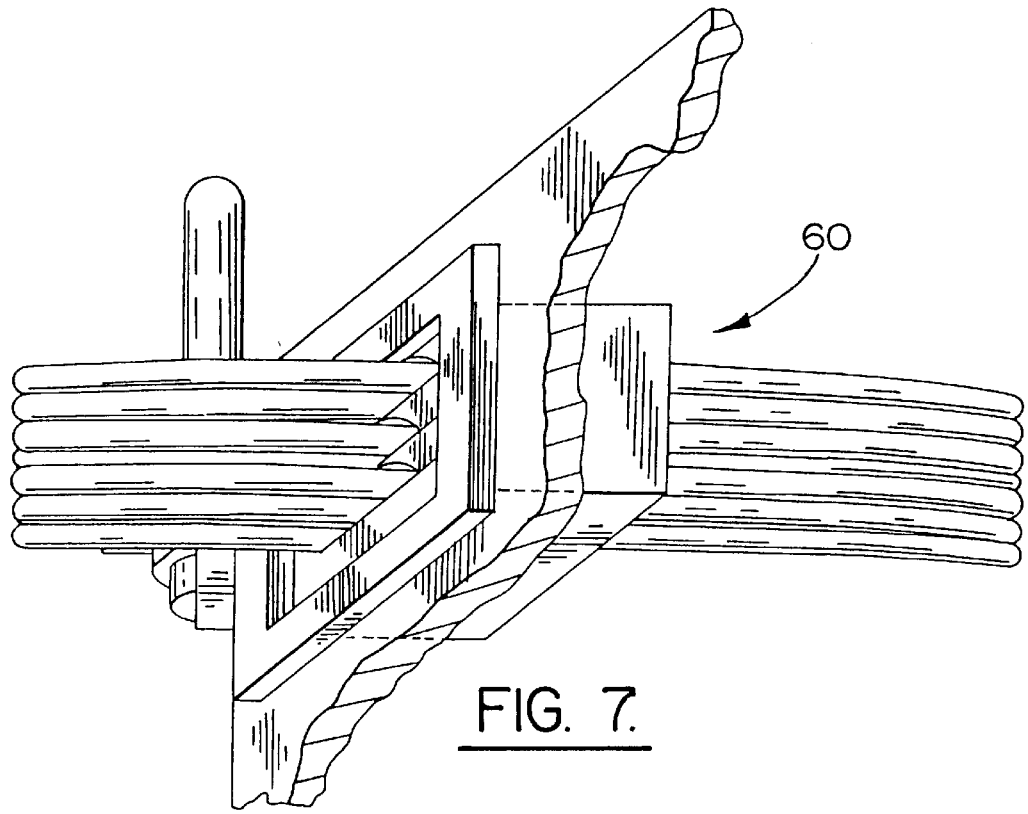
FIG. 7 is a detail perspective view of a fire-rated penetration for entry or exit of cables through a side wall of the invention.

FIGS. 3, 4 and 5 depict communications cabling and terminal equipment mounted on the equipment mounting plate 50. Shown are wire management brackets 110, patch panels 112 and associated wiring for a typical voice phone Category 3, 4, or 5 installation, according to standards promulgated by the Electrical Industry Association, Telecommunications Industry Association and the Building Industry Communications Standards Institute. Cables 120a and 120b enter and exit the enclosure through a pair of fire-rated compression-type retrofit cable penetration frameworks 60 having rubber lining and fire-rated foam insulation and padding surrounding cables 120a and 120b passing therethrough to and from the wire management brackets 110 on the mounting plate 50. FIG. 7 shows a typical cabling penetration made by CSD Sealing Systems Inc., and approved by United Laboratories and CSA. A pair of elastic spring-like retention means 70, attached at the ends thereof to the interior surface of rear side wall 14d of the cabinet, serve to lead and urge cables 120 against side wall 14d, so that they may bend and loop gradually, as required by applicable codes, toward the equipment mounting plate 50, rather than making right or acute angle turns if allowed to hang. Entering cables 120a are routed by the wired management brackets 110 to patch panels 112 where they are punched down to appropriate category specifications. Exiting cables 120b, after leaving the equipment mounting plate 50, may be routed to a work station through standard partition poles extending between floor and ceiling, or in the case of a small unpartitioned office, through the between-wall space of the nearest wall to the work station.

Figure 2:
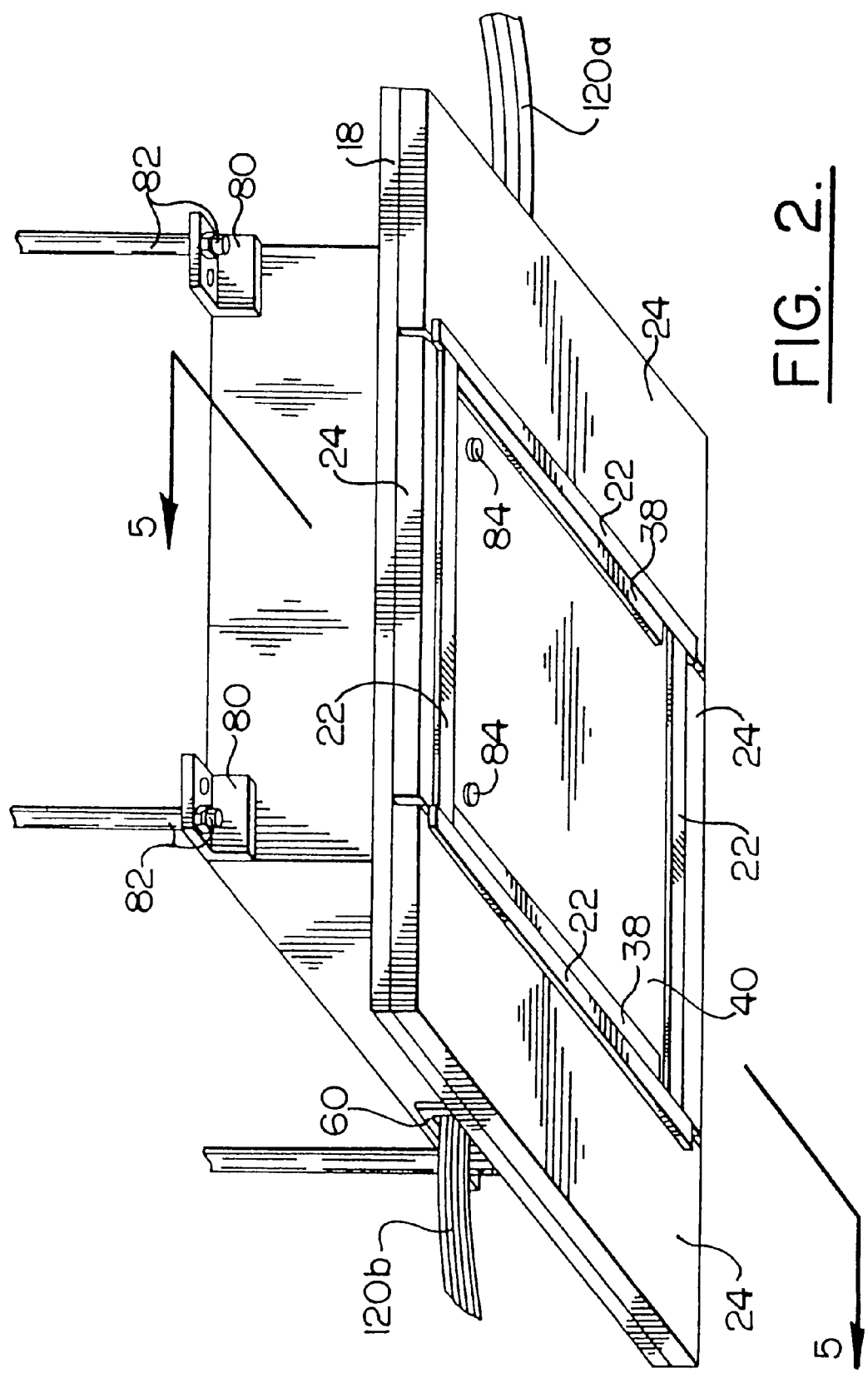
FIG. 2 is a perspective view from below of the invention without the surrounding suspended ceiling, showing the access panel and surrounding bottom wall faced with ceiling tile, and cabling entering and exiting the invention.

As shown in FIGS. 2, 4 and 5 the invention 10 is supported from the true ceiling 130. Any conventional means of support could be used. The accompanying drawings show nut and threadrod assemblies 82, of appropriate strength, through bracket means 80 attached to opposing side walls 14c and 14d at corners thereof. When installed, with access door 30 in its closed position, the cladding of ceiling tile material 24 and 40 is flush with ceiling tiles 104.

The invention presents an unobtrusive appearance from below, and creates a fire-resistant enclosure with at least a NEMA 2 rating, utilizing otherwise unused plenum space without the expense of plenum-rated materials, which can be installed in close proximity to the work station it serves, thereby saving space usable for other purposes. The decentralization of communications terminal and switching equipment facilitated by this invention means that the enclosure can be installed in the ceiling within a secure office, thereby providing access to the enclosed equipment only to the actual users thereof and their service providers. These characteristics obviously secure the privacy of the enclosed equipment more so than if it were installed in a centralized IDF serving many users. The amount of cabling is greatly reduced by the shorter routing requirements provided by this system. The removable feature of the mounting plate makes it possible to perform changes, removal, additions, and repairs to the termination and switching means at a remote workbench or tabletop. This invention is suitable for all manner of communications cabling: wire; fiber; voice category 3, 4, and 5, DATA, CCTV, and CATV cabling, in individual user-defined zones throughout any building.

Changes in construction and configuration will occur to those skilled in the art, and various modifications and embodiments may be made without departing from the scope of the invention. The specific embodiment shown in the accompanying drawings and described herein is offered by way of illustration only.

I claim:

1. An enclosure for housing communications cable termination and switching equipment in close proximity to a work station within a building, said enclosure comprising:

a cabinet of fire resistant material adapted for recessed installation in a false ceiling suspended below a true ceiling of a building, said cabinet having an enclosed interior space, side walls each having an interior surface, a top wall, and a planar bottom wall having an exterior surface and an interior surface;

support means for supporting said cabinet from said true ceiling;

a doorway to said enclosed interior space through said bottom wall;

an outward-opening door to said doorway hingedly attached to said bottom wall and movable between an open position and a closed position relative to said doorway, said door having an interior surface and an exterior surface;

latching means for holding said door in a closed position;

an equipment mounting plate removably attached to said interior surface of said door in spaced, parallel relationship to said door, said equipment mounting plate adapted for mounting cabling termination and switching equipment;

fastening means for removable attachment of said equipment mounting plate to said door;

at least two fire-resistant, insulated, padded penetration means through said side walls of said cabinet adapted for entry and exit of communications cabling going to and from said cabling termination and switching equipment;

elastic retention means attached to said interior surface of a wall of said cabinet for urging said entering and exiting communications cabling against said wall and spaced from said termination and switching equipment;

said exterior surfaces of said bottom wall and said door having removable cladding of ceiling tile material, said cladding adapted to be flush with said false ceiling, and said tile material for matching said false ceiling in substance and appearance.

2. An enclosure for housing communications cable termination and switching equipment for a work station within a building, said enclosure comprising:

a cabinet adapted for recessed installation in a suspended ceiling of a building, said cabinet having an enclosed interior space, side walls and a bottom wall;

support means for supporting said cabinet in recessed relationship to said suspended ceiling;

a doorway to said enclosed interior space through said bottom wall;

a removable access panel for closing said doorway, said access panel having an interior surface;

first fastening means for removably attaching and supporting said access panel to said bottom wall, whereby said doorway may be closed;

an equipment mounting plate removably attached to said interior surface of said access panel spaced from said panel, adapted for mounting cabling termination and switching equipment thereon;

second fastening means for removable attachment of said equipment mounting plate to said panel; and at least two penetration means through said side walls of said cabinet adapted for entry and exit of communications cabling going to and from said termination and switching equipment.

3. The device according to claim 2 wherein said cabinet and said penetration means are fabricated of fire resistant material, and said penetration means has insulated fire resistant padding surrounding said cabling passing therethrough.

4. The device according to claim 3 wherein said removable access panel is a door hingedly attached to said bottom wall, said door movable between an open position and a closed position relative to said doorway.

5. The device according to claim 4 wherein said door is downward-opening, and wherein it is additionally attached to said bottom wall by a pair of pivoting, collapsible braces which control downward travel of said door and assist in supporting said door.

6. The device according to claim 5 wherein said door and said bottom wall each have exterior surfaces, said surfaces clad with ceiling tile material to match said suspended ceiling in substance and appearance.

7. The device according to claim 6 wherein said exterior clad surfaces of said door and said bottom wall are adapted to be flush with said suspended ceiling.

8. An enclosure for housing communications cable termination and switching equipment in close proximity to a work station within a building, said enclosure comprising:

a cabinet of fire resistant material adapted for recessed installation in a false ceiling suspended below a true ceiling of a building, said cabinet having an enclosed interior space, side walls each having an interior surface, a top wall, and a planar bottom wall having an exterior surface and an interior surface, said exterior surface of said bottom wall adapted for removably attaching cladding of ceiling tile material;

support means for supporting said cabinet from said true ceiling;

a doorway to said enclosed interior space through said bottom wall;

an outward-opening door hingedly attached to said bottom wall and movable between an open position and a closed position relative to said doorway, said door having an interior surface and an exterior surface, said exterior surface of said door adapted for removably attaching cladding of ceiling tile material; and an equipment mounting plate removably attached to said interior surface of said door in spaced, parallel relationship to said door, said equipment mounting plate adapted for mounting cabling termination and switching equipment.

9. The enclosure according to claim 8, further comprising latching means for holding said door in a closed position.

10. The enclosure according to claim 8, further comprising fastening means for removable attachment of said equipment mounting plate to said door.

11. The enclosure according to claim 8, further comprising at least two fire-resistant, insulated, padded penetration means through said side walls of said cabinet adapted for entry and exit of communications cabling going to and from said cabling termination and switching equipment.

12. The enclosure according to claim 8, further comprising removable cladding of ceiling tile material adapted to be flush with said false ceiling, and said tile material matching said false ceiling in substance and appearance.

13. The enclosure according to claim 8 wherein said exterior clad surfaces of said door and said bottom wall are adapted to be flush with said suspended ceiling.

14. An enclosure for housing communications cable termination and switching equipment for a work station within a building, said enclosure comprising:

a cabinet adapted for recessed installation in a suspended ceiling of a building, said cabinet having an enclosed interior space, side walls and a bottom wall, said bottom wall having an aperture therein;

support means for supporting said cabinet in recessed relationship to said suspended ceiling;

a removable access panel for closing said aperture in said bottom wall, said access panel having an interior surface;

an equipment mounting plate removably attached to said interior surface of said access panel adapted for mounting cabling termination and switching equipment thereon; and at least two penetration means through said side walls of said cabinet adapted for entry and exit of communications cabling going to and from said termination and switching equipment.

15. The enclosure according to claim 14, wherein said mounting plate comprises edge flanges contacting said panel and placing said mounting plate in a spaced, parallel relationship to said panel.

16. The enclosure according to claim 14 wherein said cabinet and said penetration means are fabricated of fire resistant material, and said penetration means has insulated fire resistant padding surrounding said cabling passing therethrough.

17. The enclosure according to claim 14 wherein said removable access panel is hingedly attached to said bottom wall for movement between an open position and a closed position relative to said aperture.

18. The enclosure according to claim 17, wherein said access panel is outward-opening, and wherein it is additionally attached to said bottom wall by a pair of pivoting, collapsible braces which control downward travel of said access panel and assist in supporting said access panel.

* * * * *